Aug. 31, 1954  R. H. GODDARD  2,687,614
FUEL ADMISSION DEVICE FOR RESONANCE COMBUSTION APPARATUS
Original Filed Feb. 1, 1947

INVENTOR.
ROBERT H. GODDARD, DEC'D.
ESTHER C. GODDARD, EXECUTRIX
BY
Chas. T. Hawley
ATT'Y.

Patented Aug. 31, 1954

2,687,614

UNITED STATES PATENT OFFICE 2,687,614

FUEL ADMISSION DEVICE FOR RESONANCE COMBUSTION APPARATUS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Original application February 1, 1947, Serial No. 725,801. Divided and this application June 29, 1951, Serial No. 234,313

1 Claim. (Cl. 60—39.77)

This invention relates to a resonance combustion apparatus of the general type set forth in prior Patent No. 1,980,266, issued to Robert H. Goddard on November 13, 1934, and is a division of prior application Serial No. 725,801 filed February 1, 1947, now abandoned.

It is the general object of the present invention to provide improved fuel admission devices in such apparatus and to so construct and arrange said devices that direct axial air flow in either direction is largely prevented. In one form of the invention, air passages of substantially uniform cross section are also provided.

The invention further relates to arrangements and combinations of parts which will be hereinafter described and more particularly pointed out in the appended claim.

Preferred forms of the invention are shown in the drawing, in which

Figure 1:
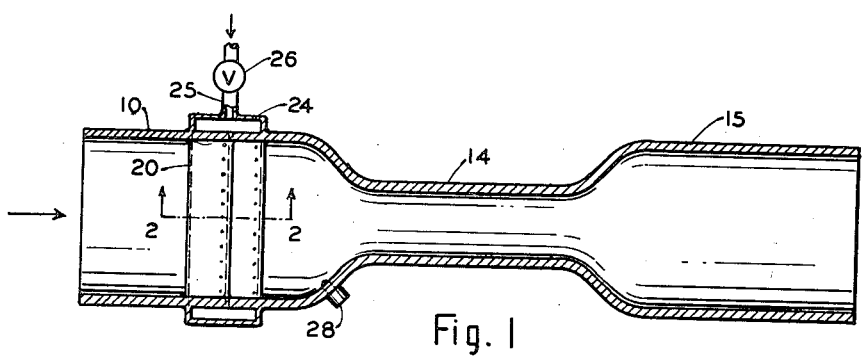
Fig. 1 is a sectional plan view of resonance apparatus embodying a preferred form of the invention.
Figure 2:
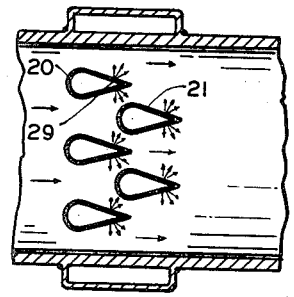
Fig. 2 is a sectional elevation, taken along the line 2—2 in Fig. 1.

Referring to Figs. 1 and 2, parts of a resonance combustion apparatus are shown comprising an air-admitting tube 10, a mixing and combustion chamber 14, and an expansion or discharge portion 15.

Fuel is admitted to the mixing and combustion chamber 14 through hollow perforated cross bars 20 and 21, which are connected at their ends to a manifold 24 to which gasoline or other suitable liquid fuel is fed through a pipe 25 and a control valve 26. One or more spark-plugs 28 may be provided to start combustion.

The cross bars 20 and 21 are preferably of the section shown in Fig. 2, with their entrance portions widened and rounded and with their exit edges tapered and substantially pointed.

The cross-bars 20 and 21 are arranged in two separate series, with the bars 21 alternating with the bars 20 as shown in Fig. 2. Perforations 29 permit the gasoline or other fuel to be sprayed into the air stream as it flows past the cross-bars.

The cross bars are so dimensioned that direct axial flow of air to or from the combustion chamber 14 is substantially prevented, while at the same time air passages of adequate cross section are provided.

Figure 3:
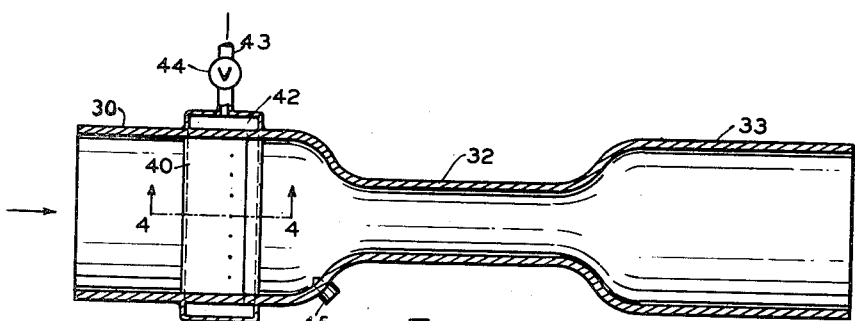
Fig. 3 is a view similar to Fig. 1 but showing a modified construction.
Figure 4:
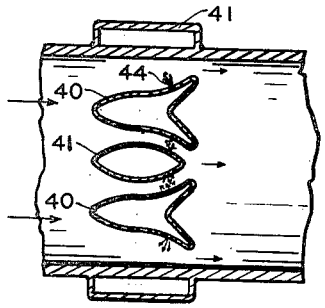
Fig. 4 is a sectional elevation, taken along the line 4—4 in Fig. 3.

In the construction shown in Figs. 3 and 4, the resonance apparatus comprises an air-admitting tube 30, a mixing and combustion chamber 32, and an expansion and discharge portion 33. Liquid fuel is admitted through cross bars 40 and 41, to which the fuel is supplied through a manifold 42, feed pipe 43 and control valve 44.

The cross bars 40 are of a general fish-tail cross section, while the cross-bar 41 has a pointed oval or lozenge section. The cross-bar 41 is mounted between two of the cross-bars 40, and the parts are so related that air passages of substantially uniform cross section are provided between the cross bars 40 and 41, where the major air flow occurs. Fuel is admitted to the air stream through ports or perforations 44, and a spark-plug 45 may be provided for starting combustion.

It will also be evident that there can be no direct axial flow of air past the cross-bars in either direction (except at the extreme outer portions thereof where the area is much restricted by the curvature of the casing).

In both forms of the apparatus, the deflection of the air from direct axial travel provides much improved mixing of the air and fuel as it enters the combustion chamber and the return flow of combustion gases is retarded.

Having thus described the invention and the advantages thereof, it will be understood that the invention is not to be limited to the details herein disclosed, otherwise than as set forth in the claim, but what is claimed is:

In a resonance apparatus, a tubular member having an air-admitting portion and a plurality of fuel-admitting cross bars fixed in a transverse series in said air-admitting portion, said cross bars being alternately lozenge-shaped and fish-tailed in section, said lozenge-shaped cross bars having their longer axes parallel to the axis of said tubular member, and said fish-tailed cross bars having relatively broader rear end portions disposed directly in the path of any return flow of gases and substantially retarding said return flow, and the adjacent rear outer edges of said fish-tailed cross bars being immovably fixed at a definite and smaller distance apart than the cross-diameter of the intervening lozenge-shaped cross bar and defining unchanging gas passages.

References Cited in the file of this patent

UNITED STATES PATENTS

| Number | Name | Date |
|---|---|---|
| 1,923,118 | Rudes et al. | Aug. 22, 1933 |
| 1,980,266 | Goddard | Nov. 13, 1934 |
| 2,505,757 | Dunbar et al. | May 2, 1950 |
| 2,528,133 | Goddard | Oct. 31, 1950 |
| 2,548,430 | Goddard | Apr. 10, 1951 |